Dec. 20, 1955     C. E. DUNTON     2,727,328
FISH NET AND SHEATH THEREFOR
Filed June 16, 1953     2 Sheets-Sheet 1
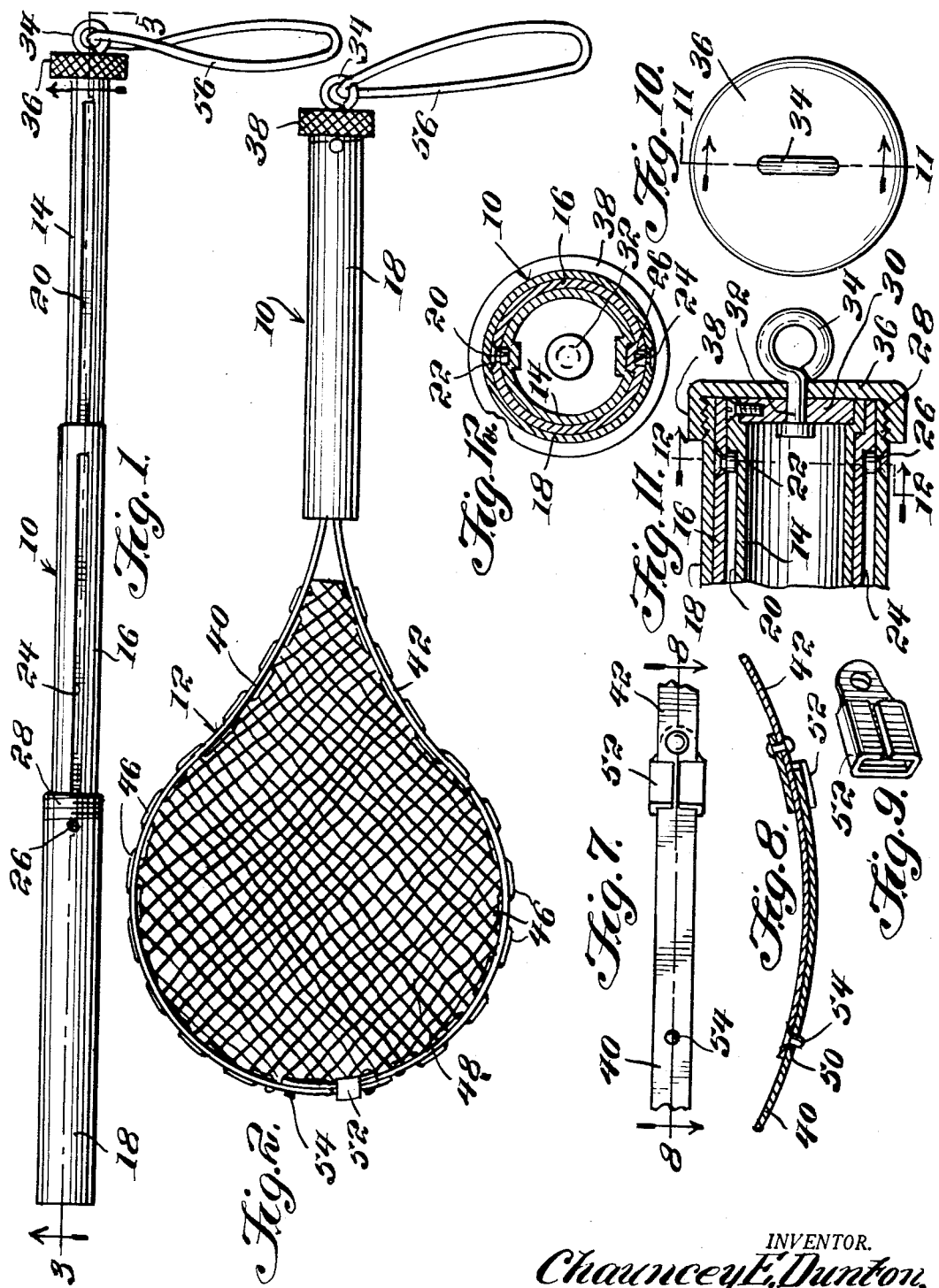
INVENTOR.
Chauncey E. Dunton,
BY
McMorrow, Berman & Davidson
ATTORNEYS Dec. 20, 1955
C. E. DUNTON
2,727,328
FISH NET AND SHEATH THEREFOR
Filed June 16, 1953
2 Sheets-Sheet 2
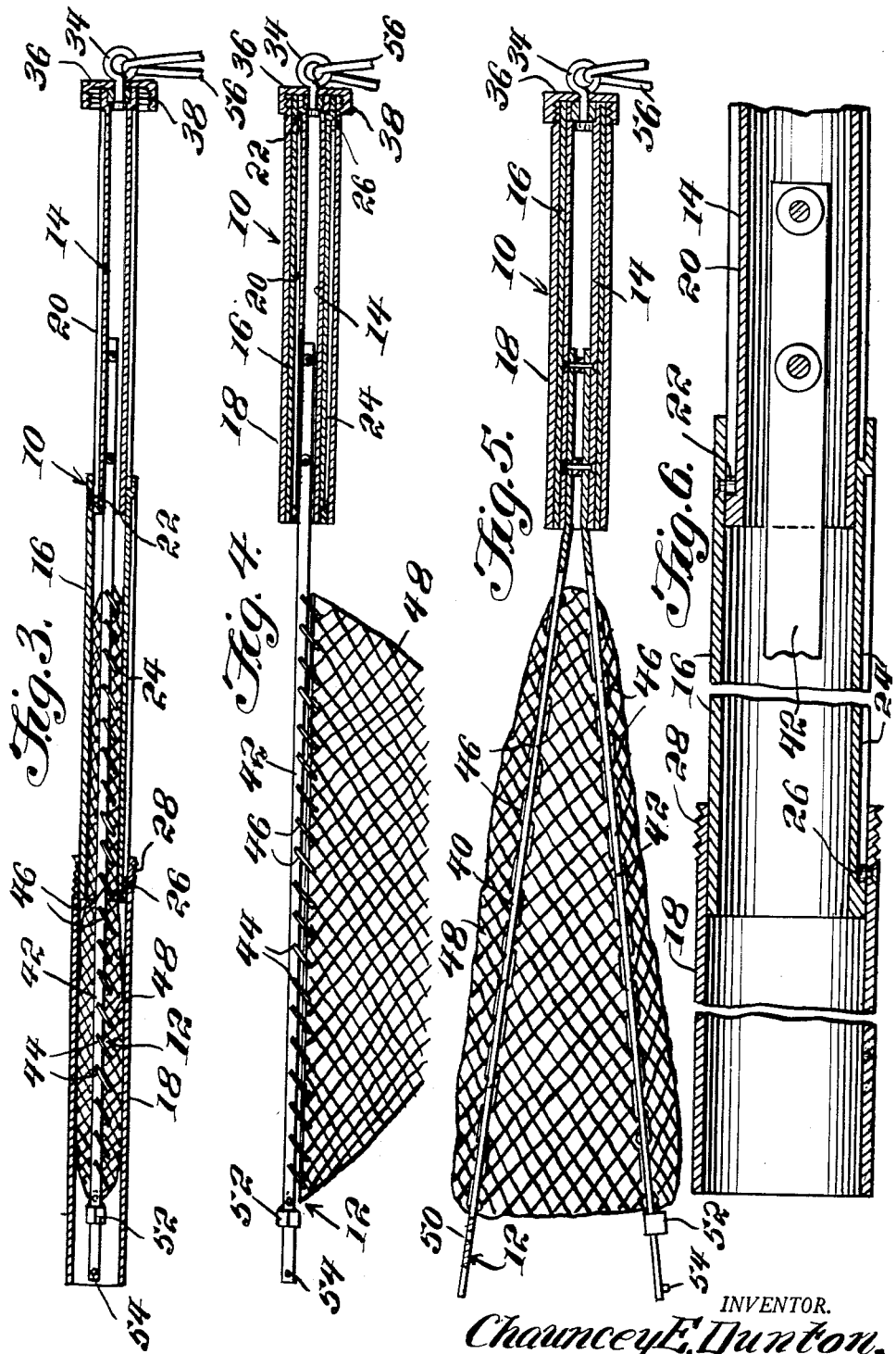
INVENTOR.
Chauncey E. Dunton,
BY
McMorrow, Berman + Davidson
ATTORNEYS United States Patent Office 2,727,328
Patented Dec. 20, 1955

2,727,328

FISH NET AND SHEATH THEREFOR

Chauncey E. Dunton, Sherburne Center, Vt.

Application June 16, 1953, Serial No. 361,988

3 Claims. (Cl. 43—12)

This invention relates to a fish net having a sheath connected thereto and the primary object of the invention is to protect the fish net from entanglement with underbrush, fishing gear or the like during transportation and storage.

Another object is to enable the fish net to be contracted into a relatively small volume to facilitate its encompassment by the sheath.

The above and other objects may be attained by employing this invention which embodies among its features a shank, resilient flexible arms carried by the shank and extending longitudinally from one end thereof, interengaging means carried by the arms adjacent the ends thereof remote from the shank for detachably connecting the arms together to define a closed loop, a flexible net carried by the arms, and a tubular handle carried by the shank for movement longitudinally thereon and into encircling relation to the arms and to the net to define a sheath that will prevent entanglement of underbrush, fishing gear or the like with the net during transportation and storage thereof.

Other features include external screw threads carried by the handle adjacent the end thereof through which the shank moves, and an internally screw threaded cap swivelly carried by the shank for threadedly engaging the threads on the handle and holding the net and arms extended, and a loop of flexible material carried by the cap for encircling the wrist of the user.

In the drawings:

Figure 1 is a side view of this device showing the net enclosed by its sheath;

Figure 2 is a plan view of the device showing the net extended from the handle and in operative condition;

Figure 3 is a longitudinal sectional view taken substantially on the line 3—3 of Figure 1;

Figure 4 is a view similar to Figure 3 showing the net projecting from the handle;

Figure 5 is a plan view of Figure 4, the handle being shown in section;

Figure 6 is a fragmentary enlarged sectional view showing the manner in which the handle and the shank of the net telescope into one another;

Figure 7 is a fragmentary enlarged view of the coupling between the arms;

Figure 8 is a horizontal sectional view taken substantially on the line 8—8 of Figure 7;

Figure 9 is a perspective view of the socket member carried by one of the arms;

Figure 10 is an enlarged end view of the handle member of the device;

Figure 11 is a sectional view taken substantially on the line 11—11 of Figure 10; and Figure 12 is a sectional view taken substantially on the line 12—12 of Figure 11.

Referring to the drawings in detail, this improved fish net comprises a handle element designated generally 10, carrying a net designated generally 12. The handle element 10 comprises a shank 14 and a sheath comprising telescopic members 16 and 18. Formed in the shank 14 and opening through the outer side thereof is an elongated longitudinal slot 20 for the reception of a stop pin 22 carried by the section 16 of the sheath. Formed in the section 16 of the sheath is an elongated longitudinal slot 24 which receives a pin 26 carried by the sheath section 18, and formed on the sheath section 18 adjacent the ends thereof through which the sheath section 16 projects are external screw threads 28, the purpose of which will hereinafter appear.

Fixed in the tubular shank 14 adjacent the end thereof remote from that which enters the sheath section 16 is a plug 30 in which is swivelly mounted the shank 32 of an eye 34, and rotatably mounted on the shank 32 of the eye 34 for rotary movement about the axis of the shank 14 is a cap 36 having an internally screw threaded flange 38 which is adapted to be threadedly engaged with the threads 28 on the sheath section 18 when the net is in extended form. The threaded flange 38 and threads 28 cooperate to retain the shank 14, sheath section 16 and sheath section 18 in telescoped relation to form a handle for the net 12, as will be readily understood upon referring to Figure 2.

Carried by and extending longitudinally from the shank 14 are arms 40 and 42 which are provided with longitudinally spaced openings 44 for the reception of laces 46 by means of which a net 48 is secured to the arms.

Formed in the arm 40 adjacent the end thereof remote from the shank 14 is an opening 50, and carried by the arm 42 adjacent its end remote from the shank 14 is a clip 52 which is adapted to receive the end of the arm 40 to hold the arms 40 and 42 bowed, as illustrated in Figure 2. A pin 54 is carried by the arm 42 for entrance into the opening 50 in the arm 40 in order to lock the arms in their bowed position. A flexible loop 56 is extended through the eye 34 in order to provide a holder which may extend around the wrist of the user during the periods that the net is in service.

In use during the periods of transportation and storage, the net is sheathed within the sheathing units 16 and 18, as illustrated in Figure 1. When it is desired to use the net, the sheathing units 16 and 18 are telescoped upon one another and upon the shank 14 so as to leave the arms 40 and 42 and the net 48 exposed, as illustrated in Figures 4 and 5. In this position, the shank 14, sheathing members 16 and 18 are telescoped into one another, as illustrated, and the cap 36 rotated to cause the threads thereof to engage the threads 28 of the sheathing member 18 to hold the parts against longitudinal movement relative to one another and in this position, the parts 14, 16 and 18 form a handle 10 for the net. After having moved the parts into the position just described, the end of the arm 40 remote from the handle 10 is entered into the socket member 52, as illustrated in Figure 2, thus causing the arms 40 and 42 to be bowed, as shown, and with the pin 54 entering the opening 50 in the arm 40, it will be evident that the parts will be locked, owing to the inherent resiliency of the arms.

When it is desired to restore the net to sheathed position, the arms 40 and 42 are disconnected adjacent therein remote from the handle 10, and upon unscrewing the cap 36 from the threaded end of the outer sheath member 18, the sheath members 16 and 18 may be extended, as illustrated in Figures 1 and 3, to enclose the net and protect it from entanglement with other fishing gear or underbrush.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a fish net, a tubular shank, an inner tubular sheath slidably telescoped on said shank, an outer tubular sheath slidably telescoped on said inner sheath, first means acting between said shank and said inner sheath precluding relative rotation thereof and limiting extension of said inner sheath relative to said shank, second means acting between said inner sheath and said outer sheath precluding relative rotation thereof and limiting extension of said outer sheath relative to said inner sheath, external screw threads on said outer sheath, an internally threaded cap journaled on said shank, said cap being threadably engageable with the threads on the outer sheath with the inner sheath contracted on the shank and with the outer sheath contracted on the inner sheath, and a net structure comprising a pair of flexible arms normally tensioned away from each other, and a flexible net secured to and extending between the arms, said arms having inner end portions extending into and secured to the tubular shank.

2. In a fish net, a tubular shank, an inner tubular sheath slidably telescoped on said shank, an outer tubular sheath slidably telescoped on said inner sheath, first means acting between said shank and said inner sheath precluding relative rotation thereof and limiting extension of said inner sheath relative to said shank, second means acting between said inner sheath and said outer sheath precluding relative rotation thereof and limiting extension of said outer sheath relative to said inner sheath, external screw threads on said outer sheath, an internally threaded cap journaled on said shank, said cap being threadably engageable with the threads on the outer sheath with the inner sheath contracted on the shank and with the outer sheath contracted on the inner sheath, and a net structure comprising a pair of flexible arms normally tensioned away from each other, a flexible net secured to and extending between the arms, said arms having inner end portions extending into and secured to the tubular shank, and means journaling said cap on the shank comprising an element secured to the shank and traversing the cap, said element having handle means thereon.

3. In a fish net, a tubular shank, an inner tubular sheath slidably telescoped on said shank, an outer tubular sheath slidably telescoped on said inner sheath, first means acting between said shank and said inner sheath precluding relative rotation thereof and limiting extension of said inner sheath relative to said shank, second means acting between said inner sheath and said outer sheath precluding relative rotation thereof and limiting extension of said outer sheath relative to said inner sheath, external screw threads on said outer sheath, an internally threaded cap journaled on said shank, said cap being threadably engageable with the threads on the outer sheath with the inner sheath contracted on the shank and with the outer sheath contracted on the inner sheath, and a net structure comprising a pair of flexible arms normally tensioned away from each other, a flexible net secured to and extending between the arms, said arms having inner end portions extending into and secured to the tubular shank, said flexible arms having outer end portions, said outer end portions being in overlapped relation, at least one of said outer end portions having a button removably engaged in a hole, and a slider on said outer end portions embracing and clamping the outer end portions together in the expanded condition of the arms and maintaining the button engaged in a hole.

References Cited in the file of this patent

UNITED STATES PATENTS

| 1,077,481 | Levy | Nov. 4, 1913 |
| 1,921,596 | Walter | Aug. 8, 1933 |
| 1,957,944 | Dexter | May 8, 1934 |
| 2,164,242 | Henry | June 27, 1939 |

FOREIGN PATENTS

| 405,432 | Great Britain | Feb. 8, 1934 |